United States Patent [19]

Sugiura et al.

[11] Patent Number: 4,849,950
[45] Date of Patent: Jul. 18, 1989

[54] DEVICE FOR REDUCING THE LEAKAGE NOISE OF A POWER CONVERTER

[75] Inventors: Hiroaki Sugiura; Yuichi Ide; Michika Uesugi, all of Fuji, Japan

[73] Assignee: Kabushiki Kaisha Toshiba, Kawasaki, Japan

[21] Appl. No.: 262,243

[22] Filed: Oct. 20, 1988

Related U.S. Application Data

[63] Continuation of Ser. No. 648,373, Sep. 7, 1984, abandoned.

[30] Foreign Application Priority Data

Sep. 12, 1983 [JP]  Japan ................................. 58-166489

[51] Int. Cl.⁴ .............................................. H02M 1/12
[52] U.S. Cl. ........................................ 363/48; 363/37
[58] Field of Search ................... 363/132, 47, 49, 36, 363/98, 126, 37

[56] References Cited

U.S. PATENT DOCUMENTS

| | | | |
|---|---|---|---|
| 3,470,450 | 9/1969 | Eriksson et al. | 363/48 |
| 3,760,256 | 9/1973 | Rast, Jr. et al. | 363/47 |
| 4,053,820 | 10/1977 | Peterson et al. | 363/48 X |
| 4,224,660 | 9/1980 | Mohan | 363/48 |
| 4,355,351 | 10/1982 | Schwarz | 363/9 |
| 4,369,490 | 1/1983 | Blum | 363/48 |

FOREIGN PATENT DOCUMENTS

| | | |
|---|---|---|
| 0057910 | 8/1982 | European Pat. Off. . |
| 57-71277 | 5/1982 | Japan . |
| 1505916 | 4/1978 | United Kingdom . |
| 2021335 | 6/1982 | United Kingdom . |

OTHER PUBLICATIONS

Australian Office Action.

*Primary Examiner*—Philip H. Leung
*Attorney, Agent, or Firm*—Cushman, Darby & Cushman

[57] ABSTRACT

A device for reducing the leakage noise of a power converter having a rectifier circuit connected to an alternating current power source and an inverter circuit connected to the rectifier circuit has a first noise filter, with a plurality of inductors and capacitors, and which is coupled between the alternating current power source and the rectifier circuit; and a second noise filter, with a plurality of inductors and capacitors, and which is coupled between the rectifier circuit and the inverter circuit.

8 Claims, 9 Drawing Sheets

DEVICE FOR REDUCING THE LEAKAGE NOISE OF A POWER CONVERTER

This is a continuation of application Ser. No. 648,373, filed Sept. 7, 1984, which was abandoned upon the filing hereof.

BACKGROUND OF THE INVENTION

This invention relates to a device for reducing the leakage noise of a power converter, which, in particular, performs an AC-DC-AC type of double conversion, which is compact, and effectively reduces the noise leakage produced by an inverter of an air conditioner, for example.

Recently, air conditioners in which the speed of the compressor motor is varied by an inverter, which is one type of power converter, and which are energy efficient and very practical compared with the prior art air conditioners in which the compressor motor is controlled by turning it on and off, have very rapidly become widespread.

FIG. 1 shows this kind of air conditioner system in which the outdoor unit contains an inverter section and a compressor, and the speed of the compressor motor is controlled by a 30–90 Hz dummy sinusoidal alternating current produced in the inverter section. In the inverter section in this kind of a structure, the alternating current (power source frequency) is converted to direct current and back to alternating current (variable frequency) by using semiconductor rectifiers and switching elements.

FIG. 2 is a basic circuit diagram of the inverter section of the air conditioner. AC power source 1 is connected in parallel to an inverter rectifier circuit 3 via the inductive load of a fan motor 9, and a four-way valve coil 10, etc. and a reactor 2 for improving the power factor. The inverter rectifier circuit 3, which is a voltage doubler rectifier circuit comprising two diodes and two capacitors, converts a 100 V AC voltage from the AC power source 1 to about a 250 V DC voltage. This DC voltage is smoothed by capacitor 4 and supplied to inverter circuit 5. In this case, the inverter circuit 5 is a three-phase circuit having six switching transistors. The operation of each of the six transistors is controlled by a control circuit (not shown) and the DC voltage is converted to a dummy sinusoidal AC voltage.

In this electrical circuit, which forms the inverter section, the double conversion of AC-DC-AC (variable frequency) is carried out until a three-phase AC current is supplied to the compressor motor 6 from the AC power source 1. At the time of these conversions, a noise voltage, which results in radio noise, is generated and leaks to the AC power source side. Consequently, as can be seen in the prior art circuits of FIGS. 3 and 4, a noise filter 7 for reducing the leakage noise has been included. In the circuit of FIG. 3, noise filter 7 has been inserted between the inverter circuit 5 and the rectifier circuit 3. This noise filter 7 is constructed of two capacitors 20 and two inductors 21, which are coupled by a ferrite core 21a. Because the current value between rectifier circuit 3 and inverter circuit 5 is about half the value on the AC power source side, the diameter of the wires used in the inductors 21 inside the noise filter 7 may be small and the inductors 21 and ferrite core 21a can be made compact. Therefore, because the major portion of the noise that is generated is based on the switching operation of the transistors inside the inverter circuit 5, which located after noise filter 7, it is possible to reduce the noise to a certain extent.

Noise, however, is not generated only by the inverter circuit 5 but also by the rectifier circuit 3 in the stage before noise filter 7.

This noise from the rectifier circuit 3 is based on the commutation operation and the amount generated, when compared to that generated from inverter circuit 5, is relatively low, but is still enough to inflict actual damage to a radio receiver which is plugged into the same AC power source. Using this kind of circuit discribed above, the amount of noise reduction is insufficient.

The electrical circuit shown in FIG. 4 has a noise filter 8, comprising four capacitors 22 and two inductors 23, which are coupled by a ferrite core 23a, inserted between the power-factor improving reactor 2 and rectifier circuit 3.

In this case, there is a redction in the noise from both the inverter circuit 5 and rectifier circuit 3. However, the noise filter 8 is inserted on the 100 V AC power supply side so the current flowing in the inductors 23 is large. Thus, the wires used in the inductors 23 must be large as must be the ferrite core 23a. The noise filter required to reduce the noise level to 55 dB is exceedingly large. Furthermore, it is necessary to increase the capacity of the ground capacitors 22 in the noise filter 8. The noise current leaking to ground from this capacitors is very large, making the device impractical.

SUMMARY OF THE INVENTION

It is, therefore, an object of the present invention to provide a new and improved device for reducing the leakage noise of a power converter in which a noise filter, comprising small inductors and capacitors, is used, and the noise leakage from the inverter circuit and rectifier circuit is effectively reduced while the size of the device is kept small.

According to the present invention, a device for reducing the leakage noise of a power converter is provided which has a first noise filter attached to the source of AC power. This first noise filter has two inductors connected in series to the AC power path, each inductor having two terminals which form the input and output terminals of the first noise filter. A ferrite core is used to couple the two inductors to one another. At least one filtering capacitor is provided, and two ground capacitors, with each ground capacitor connected in parallel between a terminal of each inductor and ground.

The output of the noise filter is coupled to a rectifier circuit which recitifies the filtered AC signal to produce a rectified DC voltage. The output of the rectifier circuit is connected to a second noise filter which has two inductors connected in series to the ouput of the rectifier circuit. The terminals of these inductors also form input and output terminals of the second noise filter. A ferrite core couples these two inductors to one another, and at least one filtering capacitor is provided.

An inverter circuit is connected to the ouput of this second noise filter and converts the DC signals produced by the rectifier circuit into an output AC signal having a predetermined frequency. The inductances and capacitances of the inductors and capacitors in the second noise filter has values which are selected to reduce the noise produced in the inverter circuit below the level to which the noise would be reduced by the first noise filter.

Alternately, the second noise filter may also have two ground capacitors which are disposed similar to those in the first noise filter.

BRIEF DESCRIPTION OF THE DRAWINGS

The present invention can be understood by reference to the accompanying drawings in which.

DETAILED DESCRIPTION OF THE PREFERRED EMBODIMENTS

Figure 1:
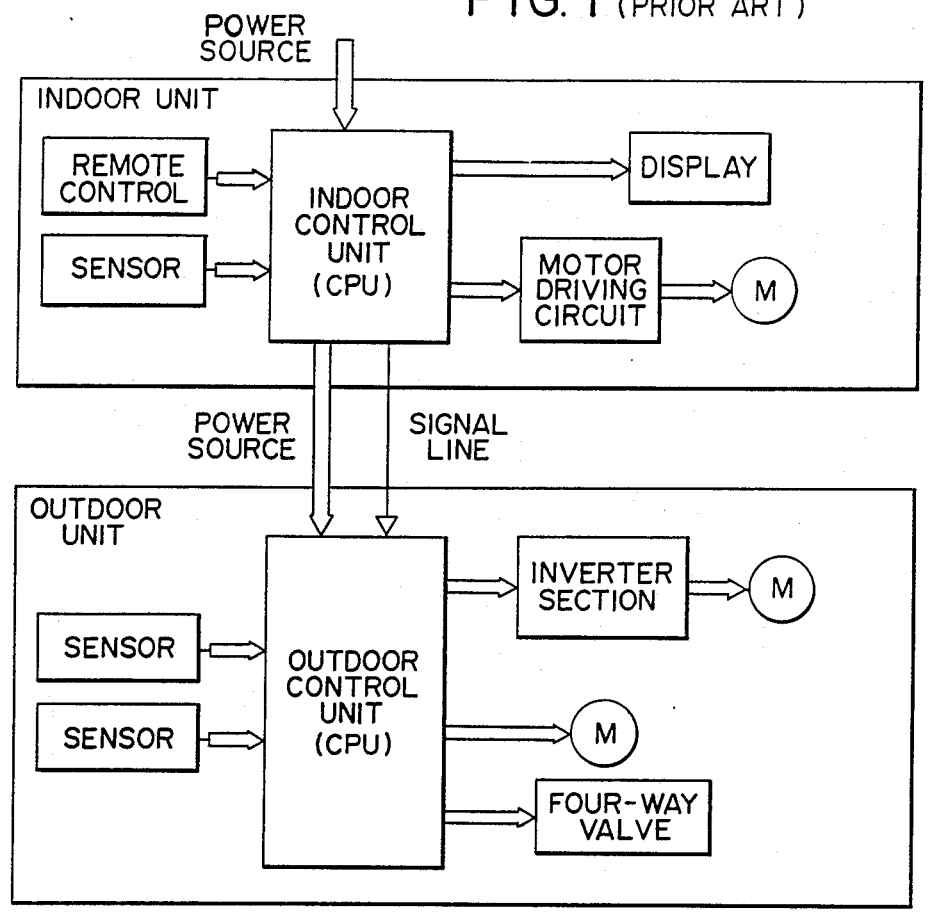
FIG. 1 shows a prior art air conditioner system which includes an inverter.
Figure 2:
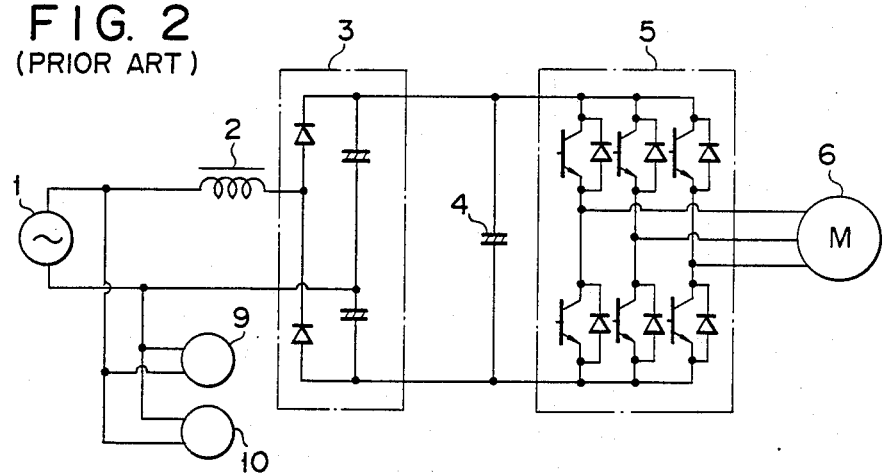
FIG. 2 is a basic circuit diagram of the inverter section of FIG. 1.
Figure 3:
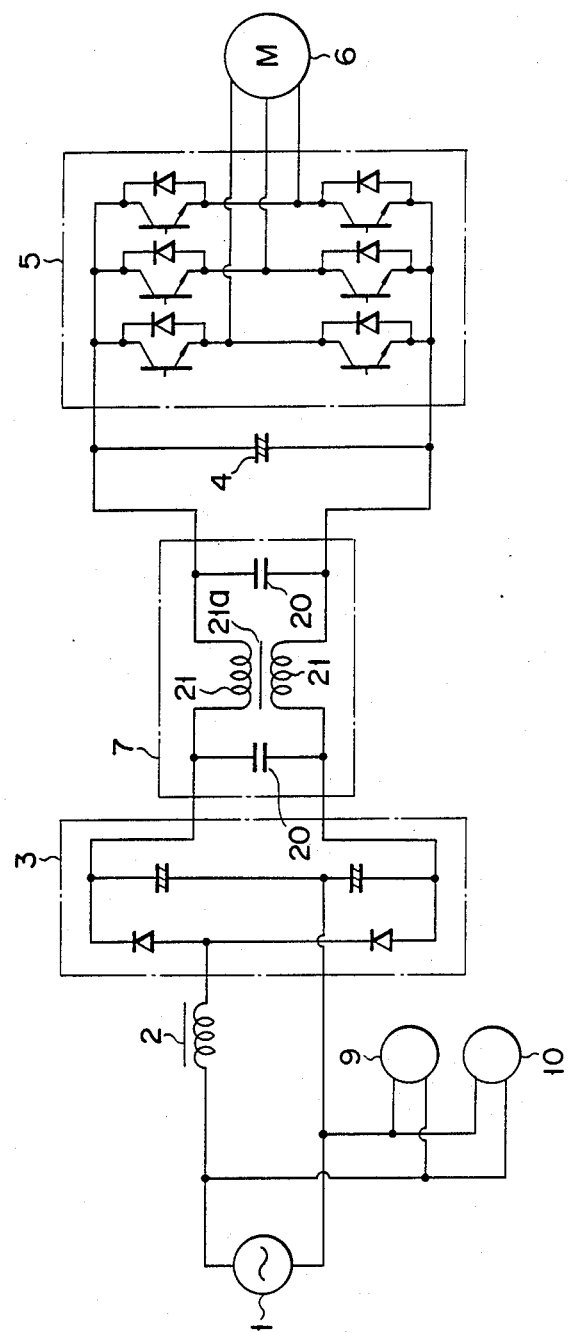
FIG. 3 is a prior art circuit diagram in which the inverter section of FIG. 1 includes a leakage noise reduction circuit.
Figure 4:
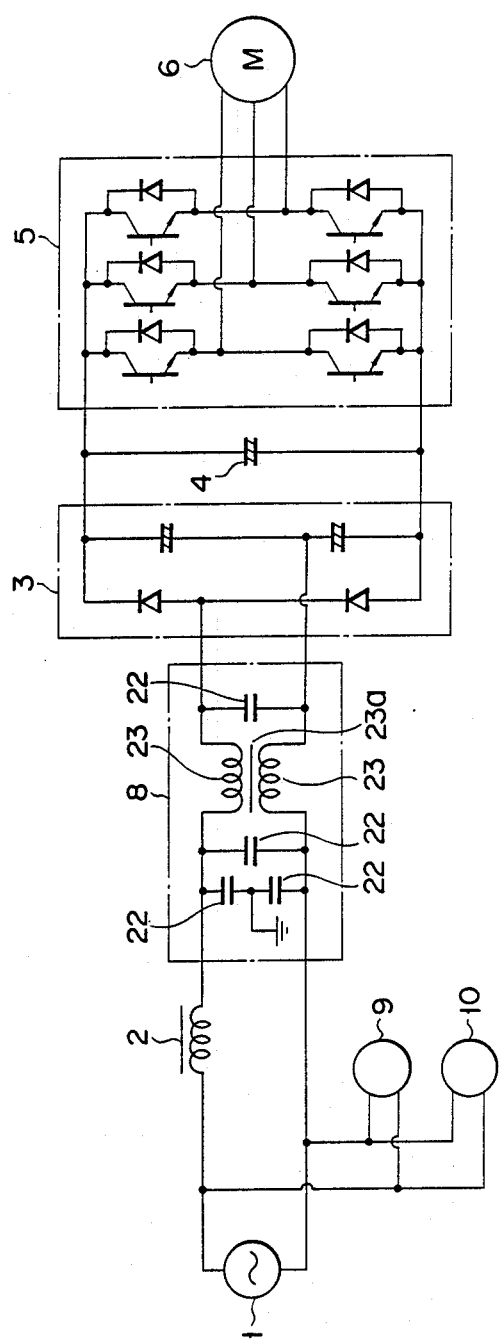
FIG. 4 is another prior art circuit diagram in which the inverter section of FIG. 1 includes a leakage noise reduction circuit.
Figure 5:
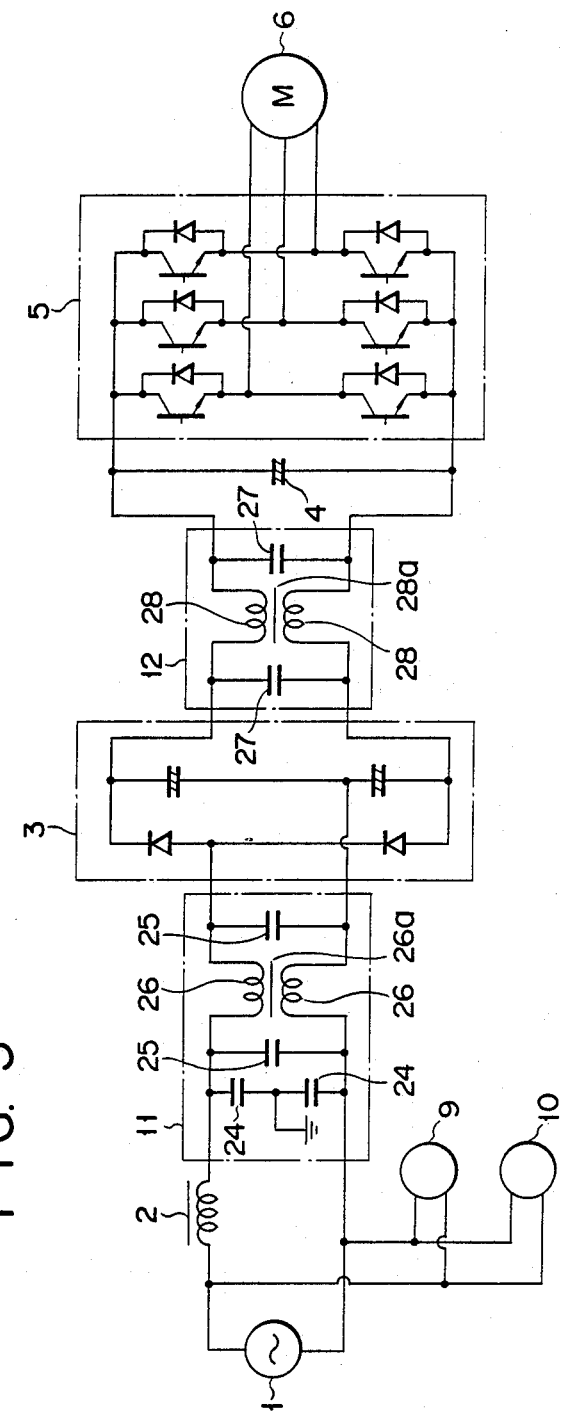
FIG. 5 is a circuit diagram of the first embodiment of the device for reducing the leakage noise of a power converter of this invention.

FIG. 5 shows the first embodiment of the device for reducing the leakage noise of a power converter of this invention as applied to the inverter section of an air conditioner. In the drawing, parts which are the same as those in FIGS. 2-4 have been given the same reference numerals, and description thereof has be omitted.

In this embodiment, voltage doubler rectifier circuit 3 is connected in parallel to AC power source 1 via the inductive load of four-way valve coil 10 and the fan motor 9, etc., and the reactor 2 for improving the power factor. A first noise filter 11, comprising two ground capacitors 24, two capacitors 25 and two inductors coupled by a ferrite core 26a, has been inserted between the reactor 2 for improving the noise factor and the voltage doubler rectifier circuit 3.

The direct current output from the voltage doubler rectifier circuit 3 is supplied to the inverter circuit 5 by way of the smoothing capacitor 4. A second noise filter 12, comprising two capacitors 27 and two inductors 28, which are coupled by a ferrite core 28a, has been inserted between the voltage doubler rectifier circuit 3 and the smoothing capacitor 4. The variable frequency AC output from the inverter circuit 5 is supplied to the compressor motor 6.

In the embodiment constructed as described above, the noise generated based on the switching operation of the semiconductor elements in the inverter circuit 5, which is the first noise generating source of radio noise, for example, is reduced by the second noise filter 12. The noise that is not eliminated by the noise filter 12 and leaks to the rectifier circuit 3 side and the noise based on the commutation operation of the rectifier circuit 3, which is the second noise generating source of radio noise, for example, are reduced by the first noise filter 11, which is inserted in between the AC power source 1 and the rectifier circuit 3, to a practically nonexistent level (normally in the 55 dB range).

Figure 6:
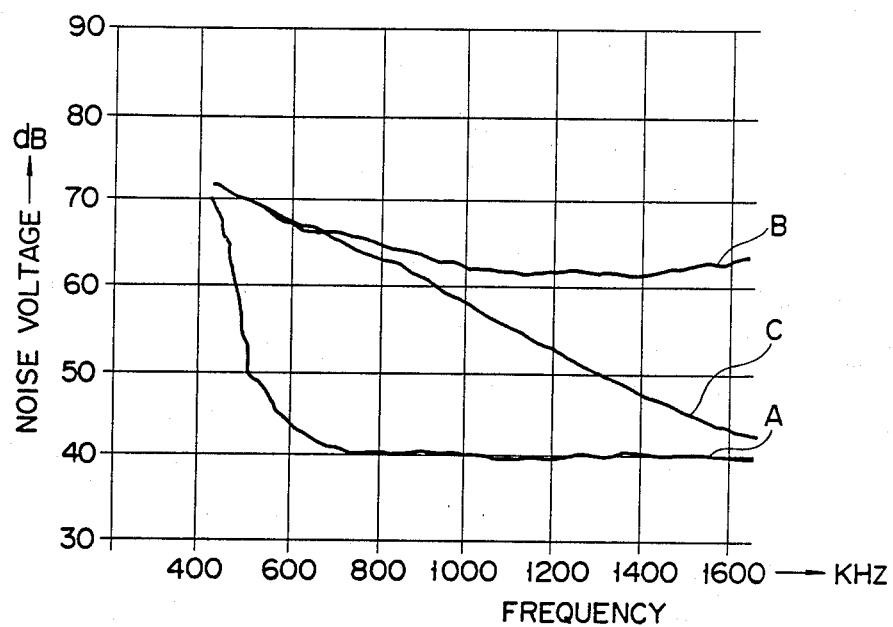
FIG. 6 is a graph which compares the leakage noise reduction effect of this invention with that of the prior art.

This noise reduction effect is shown by curve A in the graph of FIG. 6. Curves B and C show the noise reduction effect of the prior art circuits shown in FIGS. 3 and 4. It is quite obvious from this graph that this invention exhibits superlative noise reduction.

It has been confirmed in tests that the capacitors 24, 25, 27 and inductors 16, 18 that form the first and second noise filters 11, 12, which are essential to this embodiment, require ½ to ⅓ the electrical capacity of those used in the noise filters 7, 8 of the prior art noise filters. With a 1-hp air conditioner, for example, the prior art inductors required an electrical capacity of 6–10 mH, and the ground capacitors, 2000–6800 pF. In comparison to this, with this invention, the electrical capacity required is 3–5 mH for the inductors and 1500–3000 pF for the ground, capacitors, and the noise reduction is greater than in the prior art.

As a consequence of this, the capacity of the ground capacitors is reduced thereby reducing the ground leakage noise current. Also, with the reduction in capacity of the inductors and capacitors it is possible to decrease the overall size of the device. In this case, even if the diameter of the wires used in the inductors 26 of the first noise filter 11 is the same as in the prior art device, the electrical capacity, including the ferrite core, is less than half that of the prior art so the first noise filter 11 can be made as small as the second noise filter 12.

Figure 7:
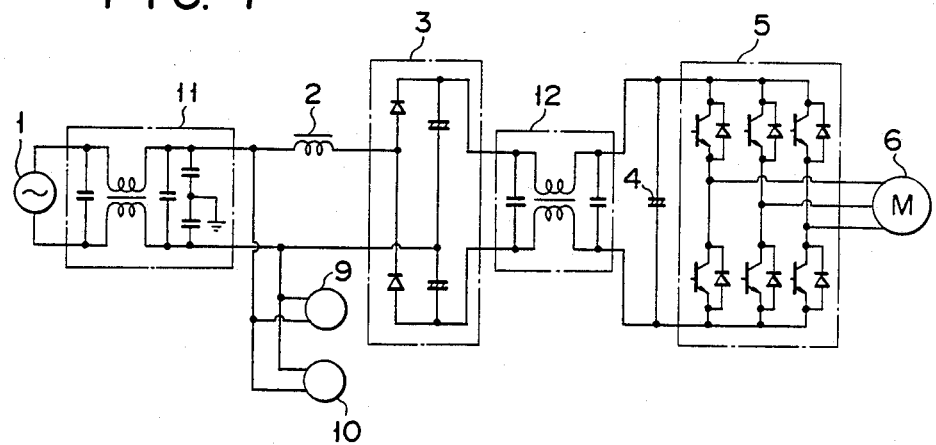
FIG. 7 is a circuit diagram of a second embodiment of this invention.

The following is a description of the second embodiment with reference to FIG. 7. In this embodiment, the fan motor 9 and four-way valve coil 10, which are the electrical parts constituting an inductive load, are connected in between the first noise filter 11 and the power-factor improvement reactor 2, which are connected in the following order AC power source 1, first noise filter 11, power-factor improving reactor 2, voltage doubler rectifier circuit 3, second noise filter 12, smoothing capacitor 4, inverter circuit 5, and compressor motor 6.

In this embodiment, the noise generated from the inverter circuit 5 is attenuated by second noise filter 12. This attenuated noise and part of the noise generated by rectifier circuit 3 is absorbed by the inductive load of the fan motor 9 and the four-way valve coil 10, which are connected to the AC line between the first noise filter 11 and the rectifier circuit 3, so that the remaining noise is further attenuated by the first noise filter 11.

With this arrangement it is possible to greatly reduce the noise leakage to the source line using a much smaller noise filter group than was possible before.

More specifically, when this embodiment is applied to a 1-hp air conditioner, it is possible to sufficiently reduce the noise with capacities of: noise filter 11 inductors–150–200 μH, ground capacitors 1000–2200 pF, and second noise filter 12 inductors - 1 mH.

Each of these values are approximately one fifth of those of the prior art and, compared with general electrical capacities, is a great reduction in size and weight for noise filters, which have become increasingly large.

Figure 8:
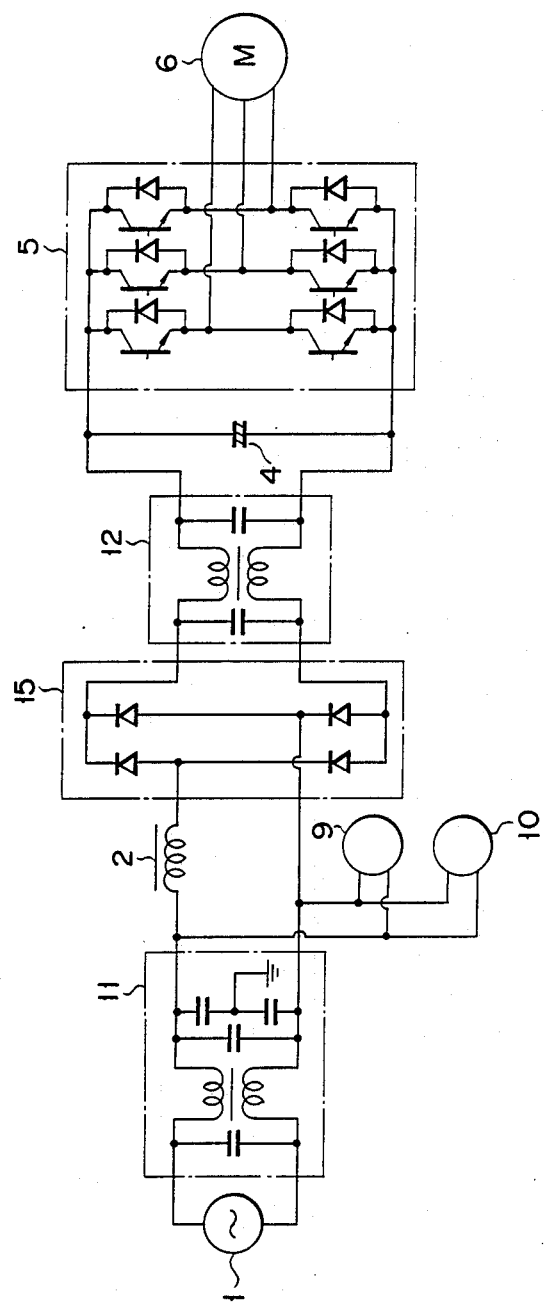
FIGS. 8–11 are circuit diagrams of different embodiments of this invention.
Figure 9:
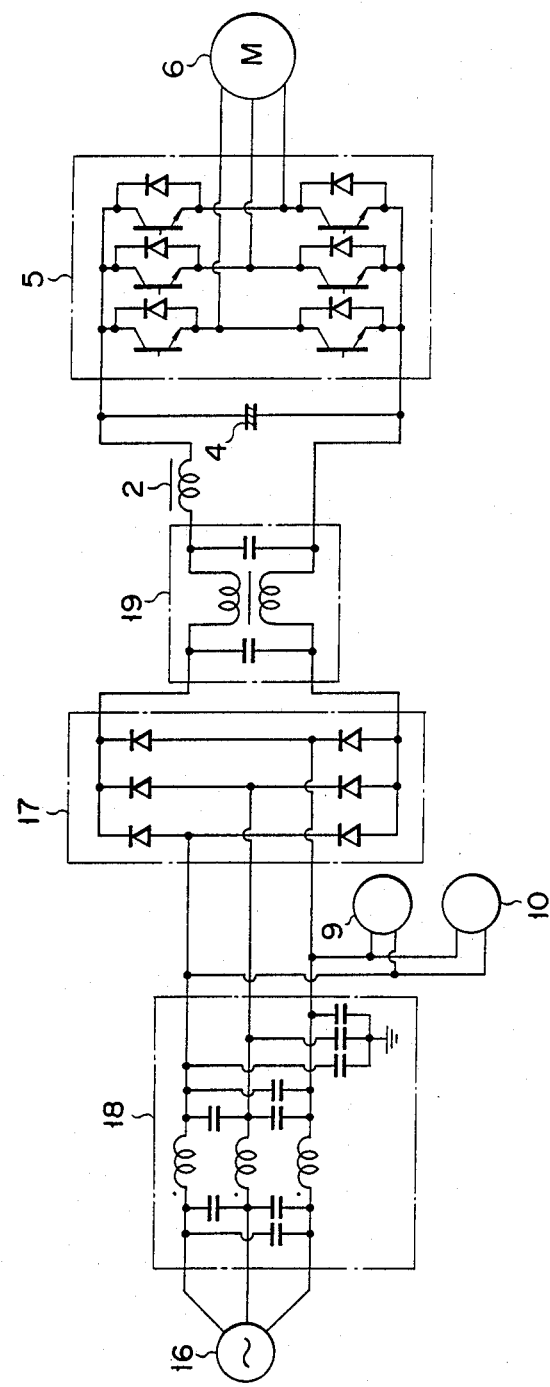

In the embodiment of this invention as applied to an air conditioner, the single phase AC power source is converted to DC by the voltage double rectifier circuit and supplied to the inverter circuit. This inverter circuit generates a three-phase AC current, which drives the compressor motor. This invention is applicable to both cases when, as shown in FIG. 8, the single-phase AC power source 1 is rectified by the full-wave rectifier circuit 15, or, as shown in FIG. 9, when a three-phase AC power source 16 is rectified by a full-wave rectifier circuit 17.

Figure 10:
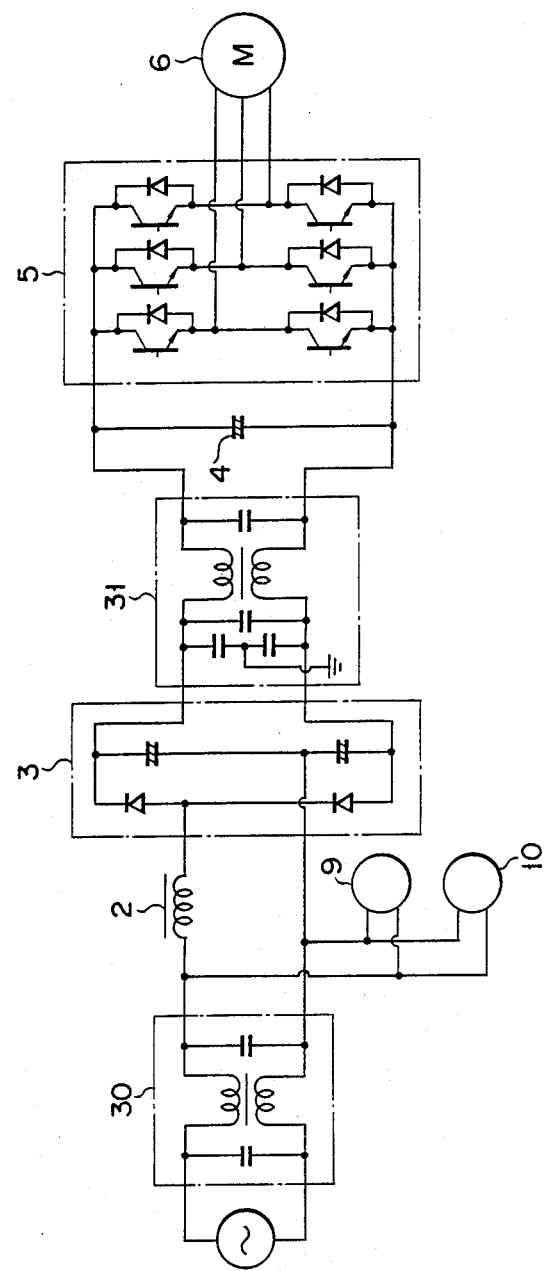

Also, as shown in FIG. 10, it is possible to obtain a similar sufficient noise attenuation effect by providing the ground capacitors with a second noise filter 31, and not providing ground capacitors for the first noise filter 30.

Figure 11:
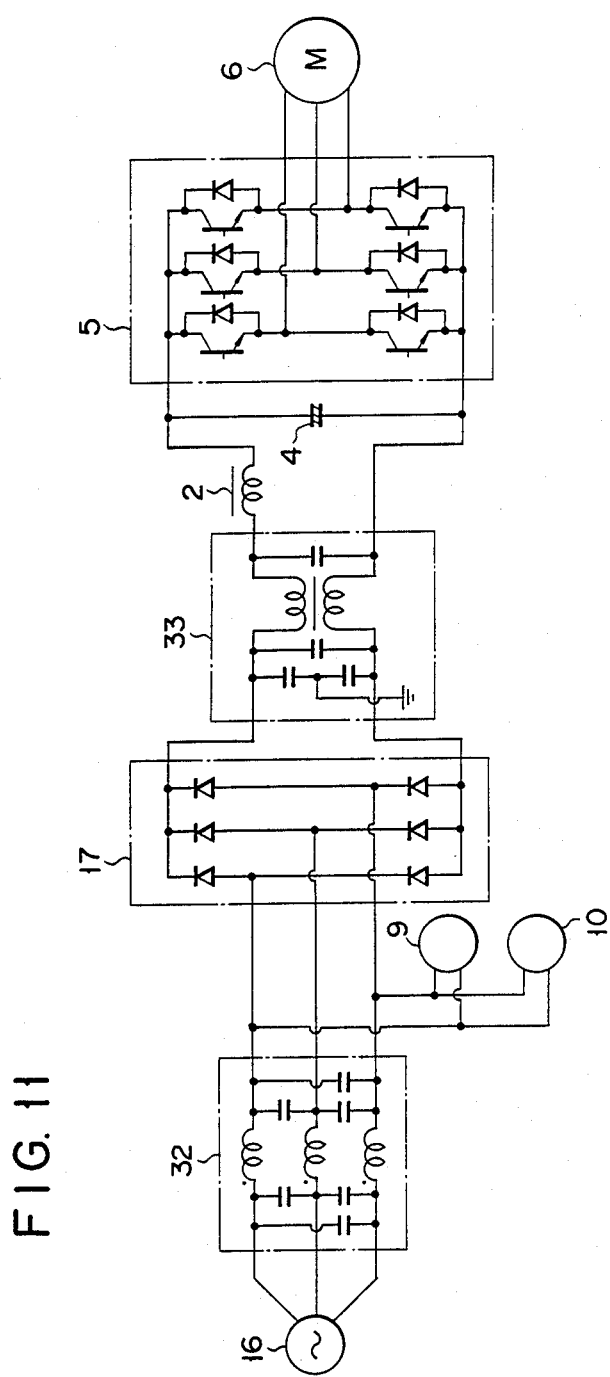

In FIG. 11, where the three-phase alternating current power source 16 is connected to the full-wave rectifier circuit 17, the ground capacitors are not provided for the first noise filter 32 but are provided for the second noise filter 33.

Regardless of to which of the first and second noise filters the ground capacitors are attached, attaching it to the rectifier circuit side will result in great noise attenuation. Further, a register or registers (not shown) other than the inductors and capacitors may be added to the first and second noise filters.

This invention is also applicable to common power converters such as inverters that are constructed of a rectifier circuit and semiconductor elements, for motor control, for example.

As was described in detail above, according to this invention, because a first noise filter is inserted between the AC power source and the rectifier circuit and a second noise filter is inserted between the rectifier circuit and the inverter circuit, the noise generated by the inverter circuit is attenuated by the second noise filter, and this attenuated noise, together with the noise generated by the rectifier circuit, is attenuated by the first noise filter. Consequently, it is possible to greatly improve the practicality of the filters by reducing the noise leakage as far as possible using compact and light weight noise filters.

What is claimed is:

1. A device for reducing the leakage noise of a power converter, comprising:
   AC power path means for transmitting an AC signal, having at least two lines adapted to be coupled to a source of AC power at one end of each said line;
   first noise filter means for preventing radio frequency noise produced in said power converter from leaking externally through said AC power path means, and having:
   (a) two inductors connected in series to the other ends of said lines of said AC power path means, the first and second terminals of each said inductor forming input and output terminals of said first noise filter means, respectively,
   (b) a ferrite core, said two inductors being coupled together by said ferrite core,
   (c) at least one capacitor, and
   (d) two ground capacitors, each said ground capacitor connected in parallel between one of the first and second terminals of each said inductor and ground;
   a rectifier circuit coupled to the output terminals of said first noise filter means, including at least one diode means for rectifying said AC signal transmitted from said AC power path means through said first noise filter means, to thereby produce a rectified DC voltage including a ripple component of said AC signal as an output signal;
   second noise filter means for preventing radio frequency noise produced in said power converter from being reflected from the power converter to the outside through said AC power path means, and having:
   (a) two inductors connected in series to said output signal of said rectifier circuit, the terminals of each said inductor forming input and output terminals of said second noise filter means,
   (b) a ferrite core, said inductors being coupled together by said ferrite core, and
   (c) at least one capacitor;
   smoothing circuit means for smoothing a ripple component of said AC signal included in said rectified DC voltage which is supplied from said rectifier circuit means through said second noise filter means, to thereby produce an output of a DC signal; and
   an inverter circuit having a plurality of semiconductor switching means for converting said DC signal supplied from said smoothing circuit means into an output AC signal of a predetermined frequency,
   the inductances and capacitances of said two inductors and said at least one capacitor of said second noise filter means having values selected so as to reduce the radio frequency noise produced in said inverter circuit below the level to which the radio frequency noise can be reduced by said first noise filter means, and
   the inductances and capacitances of said two inductors, said at least one capacitor and said two ground capacitors of said first noise filter means having values selected so as to reduce the radio frequency noise coming from said inverter circuit after being reduced by said second noise filter means and the radio frequency noise produced in said rectifier circuit to a practically negligible level.

2. The device according to claim 1, further comprising an inductive load connected between the output terminals of said two inductors of said first noise filter means.

3. The device according to claim 2, wherein said inductive load is a motor coil.

4. The device according to claim 2, wherein said inductive load is an electro-magnetic mechanism coil.

5. A device for reducing the leakage noise of a power converter, comprising:
   an AC power path means for transmitting an AC signal, having at least two lines adapted to be coupled to a source of AC power;
   a first noise filter for preventing radio frequency noise produced in said power converter from leaking externally through said AC power path means, and having
   (a) two inductors, connected in series to said AC power path means so that the terminals of each said inductor form input and output terminals of said first noise filter means,
   (b) a ferrite core, said two inductors being coupled together by said ferrite core, and
   (c) at least one capacitor;
   a rectifier circuit connected to the output terminals of said first noise filter means including at least one diode means for rectifying said AC signal transmitted from said AC power path means through said first noise filter to produce a DC rectified voltage including a ripple component of said AC signal, as an output signal;
   a second noise filter for preventing radio frequency noise produced in said power converter from leaking externally through said AC power path means, and having:
   (a) two inductors connected in series to said output signal of said rectifier circuit so that the terminals of said inductors form input and output terminals of said second noise filter,
(b) a ferrite core, said two inductors being coupled together by said ferrite core,
(c) at least one capacitor, and
(d) two ground capacitors, each said ground capacitor connected in parallel between one of the input and output terminals of each said inductor of said second noise filter and ground;

smoothing circuit means for smoothing a ripple component of said AC signal included in said rectified DC voltage which is supplied from said rectifier circuit means through said second noise filter means, to hereby output a DC signal;

an invertor circuit having a plurality of semiconductor switching elements for converting said DC signal supplied from said smoothing circuit means into an AC signal of a predetermined frequency;

the inductances and capacitances of said two inductors, said at least one capacitor and said two ground capacitors of said second noise filter having values selected so as to reduce the radio frequency noise produced in said inverter circuit below the level to which the radio frequency noise can be reduced by said first noise filter, and the inductance and capacitance values of said two inductors and said at least one capacitor of said first noise filter being selected to reduce the noise coming from said inverter circuit after being reduced by said second noise filter and the radio frequency noise produced in said rectifier circuit to a substantially negligible level.

6. The device according to claim 5, further comprising an inductive load connected between the output terminals of said two inductors of said first noise filter.

7. The device according to claim 6, wherein said inductive load is a motor coil.

8. The device according to claim 6, where in said inductive load is an electro-magnetic mechanism coil.

* * * * *